US012572576B2

US 012572576 B2

(12) United States Patent
Walsh

(10) Patent No.: US 12,572,576 B2
(45) Date of Patent: Mar. 10, 2026

(54) RECOMMENDER METHODS AND SYSTEMS FOR PATENT PROCESSING

(71) Applicant: John MacLaren Walsh, Ottawa (CA)

(72) Inventor: John MacLaren Walsh, Ottawa (CA)

(73) Assignee: John MacLaren Walsh, Ottawa (CA)

( * ) Notice: Subject to any disclaimer, the term of this patent is extended or adjusted under 35 U.S.C. 154(b) by 688 days.

(21) Appl. No.: 16/767,223

(22) PCT Filed: Nov. 29, 2018

(86) PCT No.: PCT/US2018/063065

§ 371 (c)(1),
(2) Date: May 27, 2020

(87) PCT Pub. No.: WO2019/108793

PCT Pub. Date: Jun. 6, 2019

(65) Prior Publication Data

US 2021/0011935 A1 Jan. 14, 2021

Related U.S. Application Data

(60) Provisional application No. 62/592,386, filed on Nov. 29, 2017.

(51) Int. Cl.
*G06N 20/00* (2019.01)
*G06F 16/334* (2025.01)
*G06F 40/289* (2020.01)
*G06Q 50/18* (2012.01)

(52) U.S. Cl.
CPC ........ *G06F 16/3347* (2019.01); *G06F 40/289* (2020.01); *G06N 20/00* (2019.01); *G06Q 50/184* (2013.01)

(58) Field of Classification Search
None
See application file for complete search history.

(56) References Cited

U.S. PATENT DOCUMENTS

| | | | | | |
|---|---|---|---|---|---|
| 6,038,561 | A | * | 3/2000 | Snyder | .................... G06F 16/93 707/E17.08 |
| 7,783,106 | B2 | * | 8/2010 | Cooper | ............... G06F 16/7847 348/700 |
| 7,984,053 | B2 | * | 7/2011 | Jackson | .................. G06F 16/30 707/738 |

(Continued)

OTHER PUBLICATIONS

Baron et al., "Mapping Standards to Patents using Databases of Declared Standard-Essential Patents and Systems of Technological Classification," Sep. 2015 (Year: 2015).*

(Continued)

*Primary Examiner* — Yu Zhao
(74) *Attorney, Agent, or Firm* — Christina R. Walsh

(57) ABSTRACT

Machine learning based retrieval systems and methods are disclosed for mapping between patent or patent application claims and sections of technical standards Disclosed machine learning-based patent recommender systems may be trained and evaluated on example datasets obtained using the disclosed systems and methods. Systems and methods for generating ground truth datasets associating patent claims and sections of standards from information provided in intellectual property rights (IPR) disclosures or based on user feedback are also disclosed herein.

15 Claims, 7 Drawing Sheets

(56) References Cited

U.S. PATENT DOCUMENTS

| | | | |
|---|---|---|---|
| 2006/0112027 A1* | 5/2006 | Okamoto | G06N 20/00 |
| | | | 706/14 |
| 2010/0293135 A1* | 11/2010 | Candea | G06F 16/2453 |
| | | | 707/754 |
| 2011/0191310 A1 | 8/2011 | Liao et al. | |
| 2012/0296891 A1* | 11/2012 | Rangan | G06F 16/3347 |
| | | | 707/E17.014 |
| 2012/0316421 A1* | 12/2012 | Kumar | A61B 1/000096 |
| | | | 600/407 |
| 2013/0006908 A1 | 1/2013 | Schindler | |
| 2015/0278200 A1* | 10/2015 | He | G06F 40/194 |
| | | | 704/2 |
| 2016/0132720 A1* | 5/2016 | Klare | G06V 40/171 |
| | | | 382/118 |
| 2016/0350886 A1 | 12/2016 | Jessen et al. | |
| 2017/0270115 A1 | 9/2017 | Cormack et al. | |

OTHER PUBLICATIONS

Baron et al. "Mapping Standards to Patents using Databases of Declared Standard-Essential Patents and Systems of Technological Classification." Northwestern University, Sep. 2015.
Boyd, S., & Vandenberghe, L. Introduction to Applied Linear Algebra: Vectors, Matrices, and Least Squares. Dec. 27, 2016. https://cdn.jsdelivr.net/gh/it-ebooks-0/it-ebooks-201703-part2/Vectors%2C%20Matrices%2C%20and%20Least%20Squares%20%28Stanford%20EE103%29.pdf.

* cited by examiner

100

200

300

$$M_{i,j} = \begin{cases} 1 & \exists \text{ ETSI IPR: patent } i \text{ \& standard doc. } j \\ 0 & \text{otherwise} \end{cases}$$

400

600

Recommend (partial)
answer set generated by
machine learning algorithm
to skilled human user
602

Receive modified answer
set including answers
rejected, accepted or edited
by skilled human user
604

Provide modified answer
set to machine learning
algorithm as training
(ground truth) dataset
606

700

RECOMMENDER METHODS AND SYSTEMS FOR PATENT PROCESSING

CROSS REFERENCE TO RELATED APPLICATION

This application is the U.S. National Stage, under 35 U.S.C. § 371, of International Application No. PCT/ US2018/063065 filed Nov. 29, 2018, which claims the benefit of U.S. Provisional Application No. 62/592,386, filed Nov. 29, 2017, which is incorporated by reference as if fully set forth.

FIELD OF INVENTION

This disclosure generally relates to recommender systems and methods for patent processing and valuation.

BACKGROUND

Information retrieval (IR) systems search and identify objects, which may be collections of unstructured data such as text-based information or documents, within a larger collection of data (e.g., a database) that satisfy an information need. In the context of IR, unstructured data may refer to data that does not have structure that is semantically overt or straightforward for a computer to understand other than linguistic structure of human languages, and possibly document formatting such as section headings and paragraphs. An IR system may receive a query as input that defines the information need(s), such as search strings in a web search engine, and output several objects that match the query with different levels of relevancy. An IR system may generate a numeric ranked score indicating how well each object matches the query.

FIG. 1 shows a block diagram of an example of a prior art IR system 100 for searching. In the crawling process 102, documents are collected, for example by crawling the Internet or a database. In the indexing process 104, terms in the collected documents are indexed (e.g., by an indexer) to form a data structure, which may be referred to as an inverted index list. In the retrieval and ranking process 106, users provide a query 108, and the query may be parsed and/or expanded 110 to generate a system query 112. At 114, the indexed documents (inverted index list) may be retrieved and the ranking scores between the query and the indexed documents may be obtained based on different weighting models. The answer set 116 (or ranking list) may be generated according to the ranking scores.

SUMMARY

Patent recommender methods and systems for mapping a patent to a plurality of technical standards documents in terms of relevance are disclosed herein. A computer-accessible storage device may store the patent and the plurality of technical standards documents. A processor may receive, from the computer-accessible storage device, a patent query that defines patentable subject matter of the patent. The processor may convert the patent query into a first feature vector and apply dimensionality reduction (e.g., by applying a natural language processing algorithm) to the first vector to generate a reduced dimension first feature vector. For each of the plurality of technical standards documents, the processor may: receive, from the computer-accessible storage device, the standard document; convert the technical standard document into a second feature vector; apply dimensionality reduction to the second vector to generate a reduced dimension second feature vector; concatenate the reduced dimension first vector and the a reduced dimension second feature vector to generate a stacked feature vector; and apply a machine learning algorithm (e.g., a binary classifier) to the stacked feature vector to generate a numerical score indicating how similar the patent is to the technical standard document. For each of the plurality of technical standards documents, the processor may provide the numerical score to an output device to be provided to a user.

The processor may generate a rank-ordered list of the plurality of technical standards documents in order of decreasing numerical score indicating relevance of each of the plurality of standards documents to the patent. The processor may provide the rank-ordered list of the plurality of technical standards documents to the output device to be provided to the user. The processor may convert the patent query into the first feature vector and convert the technical standard document into the second feature vector by building Term Frequency-Inverse Document Frequency (TF-IDF) vectors, respectively, from dependencies to identify frequent and distinctive words as markers.

The processor may further compare the first feature vector to the second feature vector using an information retrieval (IR) scoring method to generate an intermediate numerical score representing how similar the patent is to the standard document, and concatenate the intermediate numerical score with the reduced dimension first vector and the a reduced dimension second feature vector to generate the stacked feature vector.

The processor may further train the machine learning algorithm using at least one ground truth training dataset. The processor may generate a ground truth training dataset based on Intellectual Property Rights (IPR) disclosures by generating, for each patent-technical standard document pair in a training set, a ground truth label that is assigned a value of '1' if the patent-technical standard document pair is among the IPR disclosures, and a value of '0' otherwise. The processor may provide the scores to the output device to be provided to the user, and receive, from an input device, a ground truth training dataset based on feedback from the user that includes, for each patent-technical standard document pair in a training set, a ground truth label that is assigned is assigned a value of '1' if the user accepts a recommendation for the patent-technical standard document pair, and a value of '0' otherwise

DETAILED DESCRIPTION OF THE EMBODIMENTS

Figure 1:
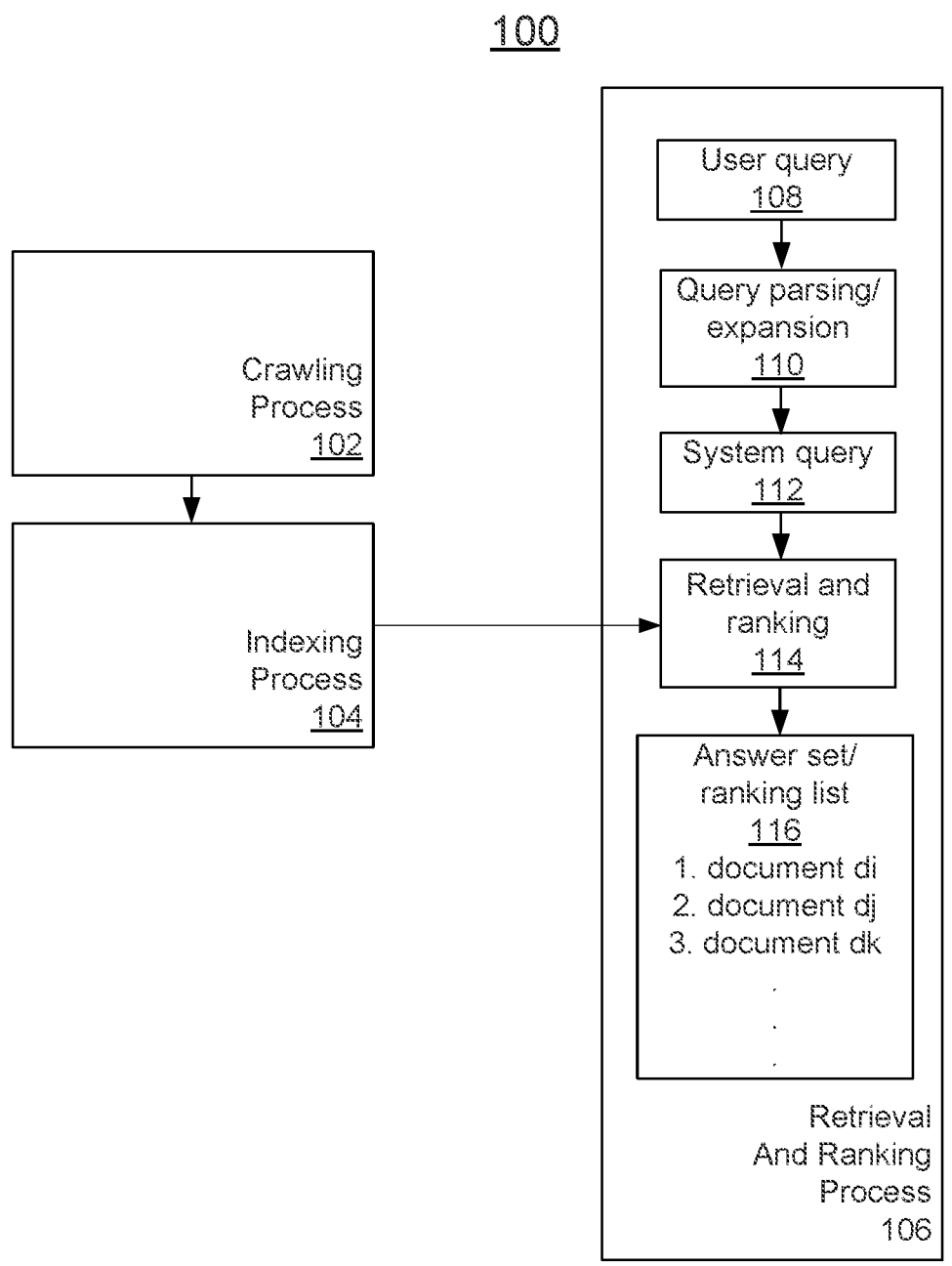
FIG. 1 shows a block diagram of an example prior art information retrieval (IR) system.

Patents may claim inventive ideas directed to technologies that are standardized by centralized organizations. For example, constantly evolving technologies for communication systems including cellular networks and wireless local area networks (WLAN) are standardized by such organizations as the Third Generation Partnership Project (3GPP), the European Telecommunications Standards Institute (ETSI) and the Institute of Electrical and Electronics Engineers. By constantly evolving and maintaining detailed standards for operation of communication systems (or other technologies), standards organizations enable uniform operation of these systems and the feasible participation and interaction of different product developers and manufacturers at different levels of the market food chain. For example, cellular communication systems require at a minimum the interaction of infrastructure systems and mobile handset devices, which are further made up of numerous interacting components in both hardware and software such as antennas, processors, sensors, power systems, user interfaces, applications, etc.

Research and development entities filing patents in these evolving technological fields at all levels of the market food chain may be actively contributing their patentable ideas to the standards bodies (e.g., through participation at standards meetings) to further the development of these technologies. In these cases, patent infringement by product manufacturers that conform to these standards may be determined based on the correspondence of essential implementations defined in the technical standards to the patent claims.

In some cases, patent owners, in particular those with extensive patent portfolios, are not easily able to identify new developments in the technical standards that correspond to their existing intellectual property (IP) and would infringe on their patent claims, which define the legal scope of the invention and patent. This is partly due to the large amount of subject matter covered in the technical standards. For example, the ETSI technical standards include over 20,000 standards documents and versions, and each standard document may include hundreds of pages of content.

It is the patent owner's burden to identify infringers and pursue licensing compensation for their costly investments in research, development and obtaining patent rights. Thus, patent owners typically work with technical experts and patent attorneys to determine patent claim relevance and essentiality to the constantly evolving technical standards, which adds further significant cost to the monetization of IP. Additionally, standards organizations also have an interest in knowing if standards are protected by essential patents in order to ensure proper licensing (e.g., through fair, reasonable and non-discriminatory (FRAND) terms and agreements), and often have a disclosure requirement for consortium members to disclose all known intellectual property rights (IPR) that are standards essential.

Existing IR systems for patent documents are concerned with indexing the terms/words in patent documents, prior art search and assignment of topic classification codes to patents. Currently, there is a lack of automated tools to assist in determining the relevance of patent claims to technical standards.

Thus, systems and methods are disclosed herein to recommend relevant sections of technical standards to patent claims, and rank order the identified standards sections, using novel IR techniques. The disclosed recommender systems and methods include automated tools that recommend relevant patent sections for pending or granted patent claims (or other patent metadata) and may be used by patent owners to more efficiently draft patent claims, identify standards essential patents, identify prior art, and map patent claims to the relevant standards sections, thereby potentially greatly reducing the cost associated with valuating and monetizing patents.

Patent IR is unique compared to broader information retrieval because the search terms may be entire patents or claims, not short collections of key words. The very notion of a patent, that an original idea is being documented, often involves the creation of new words, implying a more diverse vocabulary than, for instance, web search. Furthermore, patents are special legal documents using phrases and word patterns that would never appear in a newspaper or an ordinary webpage. It is the syntactical meaning in claims, not the frequencies with which terms appear, that determine what is patented, yet these structures are very different from ordinary natural language, and hence require specialized IR.

In the following, example embodiments of disclosed recommender systems and methods are described with respect to the ETSI 3GPP series of technical standards for wireless communications systems. However, the methods and systems disclosed herein may similarly be applied to any other technical standards in any other technological field. Moreover, the recommender systems and methods described herein may be used to map patent claims or patent metadata to other types of technical documents such as product description manuals or technical papers.

Figure 2:
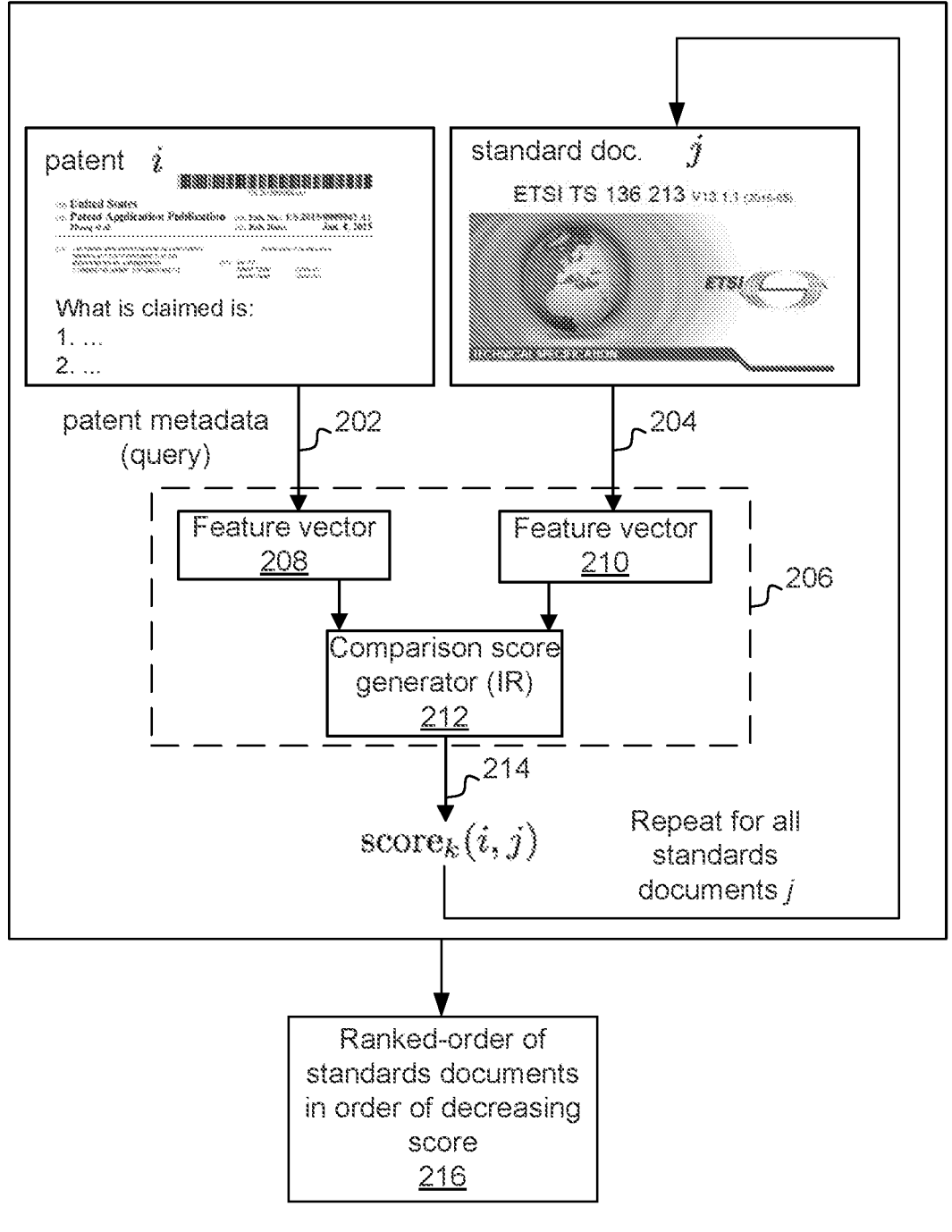
FIG. 2 shows a block diagram of an example IR system that maps patent claims to technical standards sections by providing a ranked score, in accordance with the disclosures herein.

FIG. 2 shows a block diagram of an example patent recommender system 200 that maps patent claims, or other patent metadata, to technical standards sections in a collection of technical standards by providing a ranked score, in accordance with the disclosures herein.

The patent-standard comparison system 206 receives as input a query 202, from patent i, and a standard document 204 (from standard document j). The query 202 may be one or more patent claims or other patent metadata from patent i that may define the patentable subject matter of patent i. The standard document 204 may be an entire technical specification document j, or may be a subset, section or subsection of a technical specification document j. The patent-standard comparison system 206 may use machine learning to perform feature extraction from the patent claims 202 and convert the patent claims into feature vector 208 of numbers compatible with classifiers, and likewise perform feature extraction on the standard document 204 and convert the standard document 204 into feature vector 210 of numbers compatible with classifiers (e.g., binary classifiers), so that comparisons between the query 202 and the standards document 204 can be made by comparison score generator 212.

A feature vector (FV) is a vector of real numbers that represents information (i.e., the patent claims 202 or the standards document 204) in numerical form so that it can be subsequently processed. In a simple example, a feature vector may be generated using a Bag of Words (BoW) algorithm that counts how many times a word appears in a document. However, a feature vector representation generated by BoW does not provide an order or relationship among words and fails to provide deep meaning. In another example, a feature vector may be generated by building a Term Frequency-Inverse Document Frequency (TF-IDF) vector from dependencies to identify frequent and distinctive words as markers. A TF-IDF is created by combining two numbers: the term frequency (TF) measures how often the term appears in the document while the document frequency (DF) measures how many different documents this term appears in. Important words for summarizing the meaning of a document will be both common in the document (high TF) and rare across different documents (low DF and therefore a high IDF), and will according have a high TF-IDF value in the component of the TF-IDF vector (i.e., feature vector) associated with this term. In another example, the feature vector for a block of text may be created via an embedding layer of a deep neural network that is trained up across multiple documents. Novel approaches to generating the feature vectors 108 and 110 are described in further detail below.

With reference to FIG. 2, the comparison score generator 212 may use scoring methods from IR to compare the feature vector 208 for the patent 202 and the feature vector 210 for the standards document 204, and generate a numerical value, score$_k$(ij), that represents how similar patent i is to standard document j. Examples of scoring methods include, but are not limited to, any of the scoring models defined by Terrier open source IR software packages, such as the BB2 Bose-Einstein model from randomness, Hiemstra's language model, or the BM25 probabilistic model. The scoring models may treat individual words appearing in the patent claims and standards as terms, or may be based on dependency triplicates produced from a natural language processing (NLP) system.

The patent-standard comparison system 206 repeats this process for each standards document j in the corpus of standard documents (e.g., j standards documents), and produces a ranked-ordered list of the standards documents 216 in order of decreasing score in terms of relevance to patent i.

According to the disclosures herein, ground truth datasets associating patent claims and sections of standards may be obtained and used for training and evaluation data, and in particular may be used to train any of the disclosed patent recommender systems. Technical standards are typically developed by a panel of experts, who may be employed by large engineering companies. During the standards' implementation process, standards organizations need to get licenses to all essential patents, which are those patents that claim an invention that must be used to comply with a technical standard. In this process, most standard organizations require their participants to follow a FRAND agreement with their fellow members to license essential patents. For this purpose, members (i.e. participants) on the standard implementation panel are required to disclose and grant licenses to all of their patents and pending applications which cover any particular technical standards document(s).

In an example for the ETSI telecommunication standards, a ground truth datasets for associating may be are extracted and curated from information provided in IPR disclosures to the European Telecommunications Standards Institute (ETSI). The ETSI IPR disclosures map disclosed patents and patent publications to specific versions (updates) of ETSI technical standards document(s).

In an example, one or more ground truth datasets may be collected and curated from ETSI IPR disclosures. These disclosures are from member companies and assert relevance of a particular patent or patent application that the company owns to a particular section of a communications technology standard. An example method 300 for generating

Figure 3:
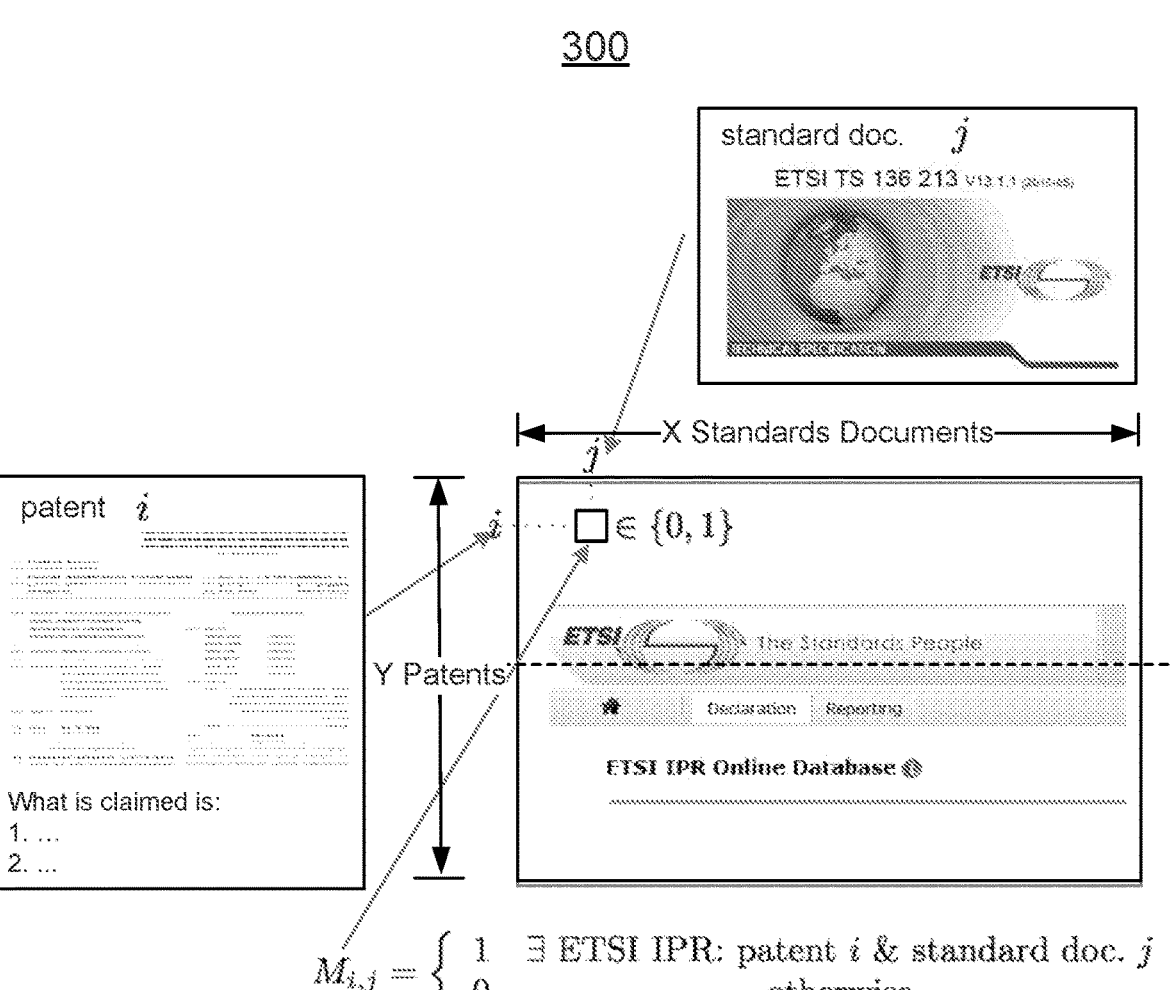
FIG. 3 shows an example method for generating a ground truth dataset from the ETSI IPR disclosures, in accordance with the disclosures herein.

6 a ground truth dataset from the ETSI IPR disclosures is illustrated in FIG. 3. In the example of FIG. 3, the IPR disclosures include disclosed mappings between X standards documents and Y patent documents (patents or published patent applications). According to the method 300, for each pair of the i=1 . . . Y patent documents and the j=1 . . . X standards documents, a ground truth label $M_{i,j}$ is assigned a value of '1' if the (patent, standard) pair is among the ETSI IPR disclosures, and a value of '0' otherwise:

$$M_{i,j} = \begin{cases} 1 & \text{if patent } i \text{ and standards document} \\ & j \in \text{ETSI IPR disclosure} \\ 0 & \text{otherwise} \end{cases} \qquad \text{Equation (1)}$$

In an example, a ground truth dataset was generated from technologies collectively known as Long Term Evolution Advanced (LTE Advanced), release 10 as described in 30 different standards documents from the Third Generation Partnership Project (3GPP), and collects all 1941 patents asserted to be related to these technologies as reported to 3GPP and ETSI as of Aug. 30, 2015. In another example, a ground truth dataset was generated from, which the 528 ETSI standards documents and 6036 patent applications for which intellectual property rights have been disclosed to ETSI as of Jun. 22, 2016. Other approaches may be used for generating or determining the set of ground truth labels.

According to the disclosures herein, the generated ground truth labels (such as those generated by the method 300) may be used to train machine learning-based mapping recommender systems, such as those disclosed below. The machine learning-based mapping recommender systems disclosed herein leverage machine learning techniques trained on subsets of the collected dataset to improve the IR performance for the patent recommender system.

Figure 4:
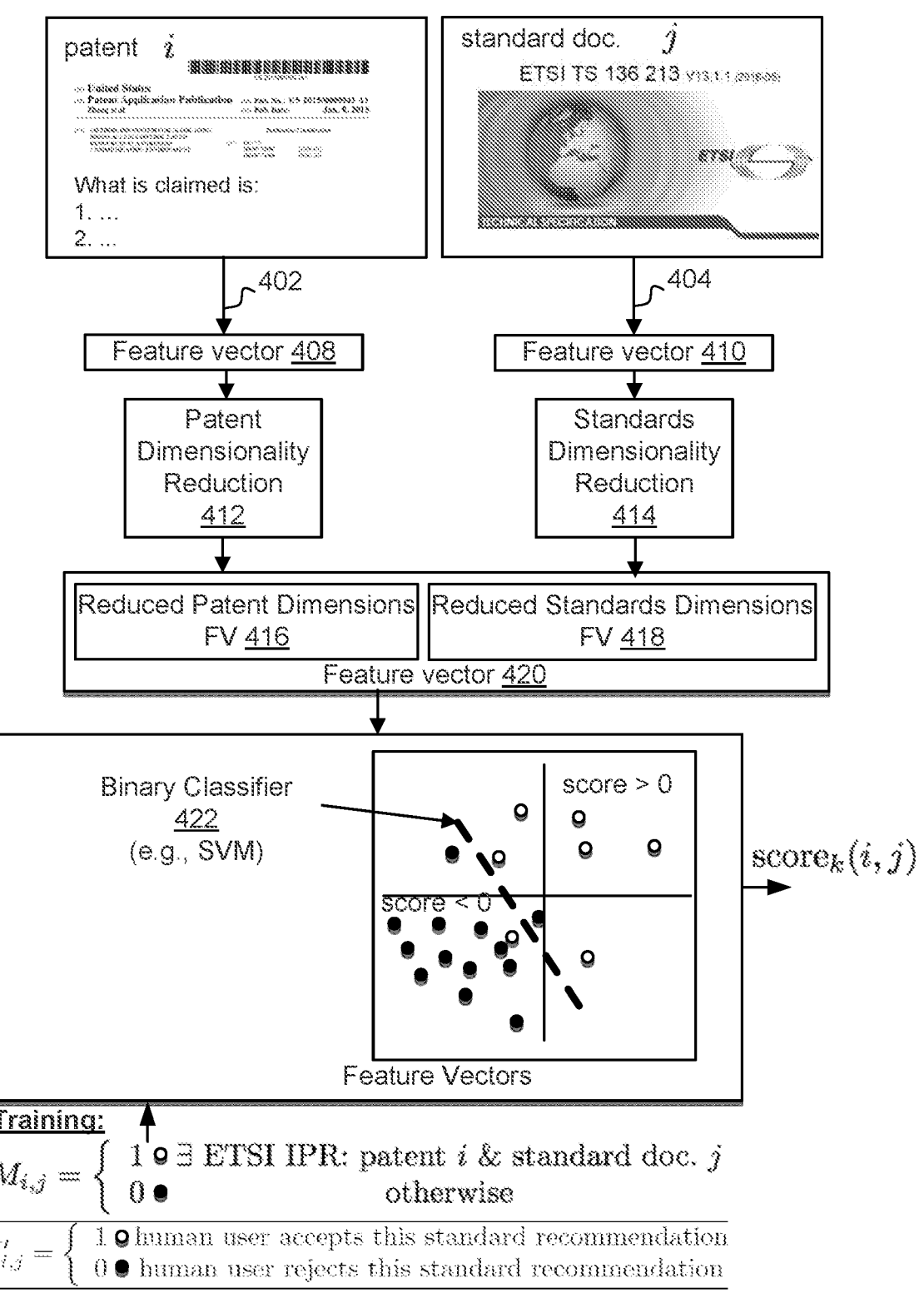
FIG. 4 shows a block diagram of an example machine learning-based patent recommender system, in accordance with the disclosures herein.

In a first example, a disclosed machine-learning based mapping recommender system may form a dimension-reduced feature vector by concatenating feature vectors (such as feature vectors built from TF-IDFs) that were generated for a patent and standard document pair, and train a binary classifier based on a subset of the training data indicating which patent application-standard document pairs are deemed to be related (e.g., ground truth datasets generated based on IPR disclosures as per the method in FIG. 3). FIG. 4 shows a block diagram of an example machine learning-based patent recommender system 400, in accordance with the disclosures herein. Feature vector 408 is generated (e.g., by a feature vector generator 408) from the query 402 from patent i and feature vector 410 is generated (e.g., by a feature vector generator 410) from standards document 404 (technical specification document j). Patent dimensionality reduction 412 is applied to feature vector 408, and similarly standards dimensionality reduction 414 is applied to feature vector 410, to reduce the dimensions of the respective feature vectors 408 and 410. For example, a natural language processing algorithm, such as latent semantic analysis (LSA), may be used to reduce the dimensionality of the feature vectors 408 and 410.

The reduced dimension feature vectors 416 and 418 are concatenated to generate stacked feature vector 420, which may then be evaluated by a machine learning binary classifier 422 to generate a score(ij) for the patent i and standards document j pair (and if relevant information retrieval model k) that represents how similar patent i is to standard document j. For example, a higher score implies that patent i is more similar or relevant to document j. An example of a machine learning binary classifier 422 is a support vector machine (SVM), which is a supervised learning model with associated learning algorithms that analyzes data used for classification and regression analysis. The binary classifier 422 may use one or more training sets to improve the performance of the binary classifier 422 in producing more relevant and useful scores(ij). For example, the binary classifier 422 may train based on the ground truth datasets $M_{i,j}$ (for all i in training set, and all standards documents j) generated from the ETSI IPR disclosures as described in FIG. 4, and/or ground truth datasets $M'_{i,j}$ (for all i in training set, and all standards documents j) generated based on human user input as described in FIG. 6. Although not shown in FIG. 4, the machine learning-based patent recommender system 400 may repeat the process for each standards document j in the corpus of standard documents (e.g., j standards documents), and may produce a ranked-ordered list of the standards documents in order of decreasing score in terms of relevance to patent i.

Figure 5:
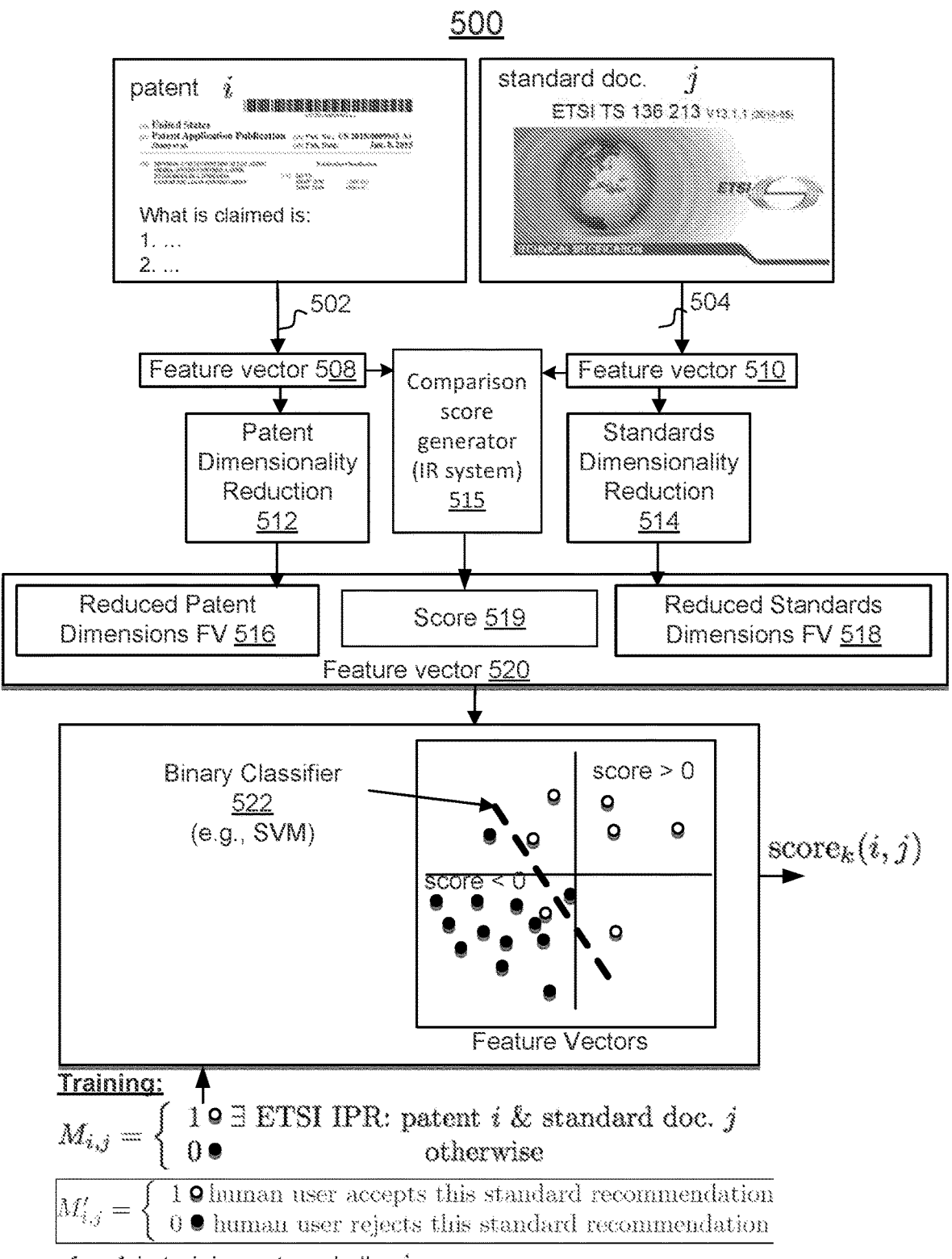
FIG. 5 shows a block diagram of another example machine learning-based patent recommender system, in accordance with the disclosures herein.

FIG. 5 shows a block diagram of another example machine learning-based patent recommender system 500, in accordance with the disclosures herein. The machine learning-based patent recommender system 500 augments the feature vector 420 of the machine learning-based system 400 in FIG. 4 with the scores obtained under each of a plurality of IR scoring models (comparison score generator 515, such as any of the Terrier IR models), to train a more capable binary classifier 522 from the augmented feature vector 520.

According to FIG. 5, feature vector 508 is generated e.g., by a feature vector generator 508) from the query 502 from patent i and feature vector 510 is generated e.g., by a feature vector generator 510) from standards document 504 (technical specification document j). Patent dimensionality reduction 512 is applied to feature vector 508, and similarly standards dimensionality reduction 514 is applied to feature vector 510, to reduce the dimensions of the respective feature vectors 508 and 510. Additionally, a comparison score generator 515 uses scoring methods from IR to compare the feature vector 508 for the patent i and the feature vector 510 for the standards document j to generate an intermediate score 519.

The reduced dimensioned feature vectors 516 and 518 and intermediate score 519 are concatenated to generate stacked feature vector 520, which may then be evaluated by a machine learning binary classifier 522 (e.g., SVM) to generate a score(i,j) for the patent i and standards document j pair (and if relevant information retrieval model k) that represents how similar patent i is to standard document j. The binary classifier 522 may use one or more training sets to improve the performance of the binary classifier 522 in producing more relevant and useful scores(i,j). For example, the binary classifier 522 may train based on the ground truth datasets (for all i in training set, and all standards documents j) generated from the ETSI IPR disclosures as described in FIG. 4, and/or ground truth datasets $M_{i,j}$ (for all i in training set, and all standards documents j) generated based on human user input as described in FIG. 6. Although not shown in FIG. 5, the machine learning-based patent recommender system 500 may repeat the process for each standards document j in the corpus of standard documents (e.g., j standards documents), and produces a ranked-ordered list of the standards documents in order of decreasing score in terms of relevance to patent i.

Adding the capability to learn in a supervised manner from ground truth connecting parts of the standard with a patent enables the learning systems 400 and 500 shown in FIGS. 4 and 5 to detect patterns relating patents to standards that are specific to the language used in patents and standards. For instance, if the phrase describing a particular technology differs in the claim and in the standards, the learning algorithm can pick up a correspondence between this phrase based on the training dataset. By contrast, a baseline IR system, such as the one shown in FIG. 1, will use scoring methods that are independent from these corpora and the particular problem, resorting to finding correspondences which are more heavily based on matching terms that do not perform as well.

Moreover, by augmenting the feature vector from the standard and the feature vector from the patent with scores from an IR system, the machine learning-based patent recommender system 500 shown in FIG. 5 enables the classifier to consider how an IR system would have scored the correspondence between the patent and standard text when forming its rule for determining when this correspondence is close. This additional feature data has proven very useful in experiments with prototypes of this system.

Figure 6:
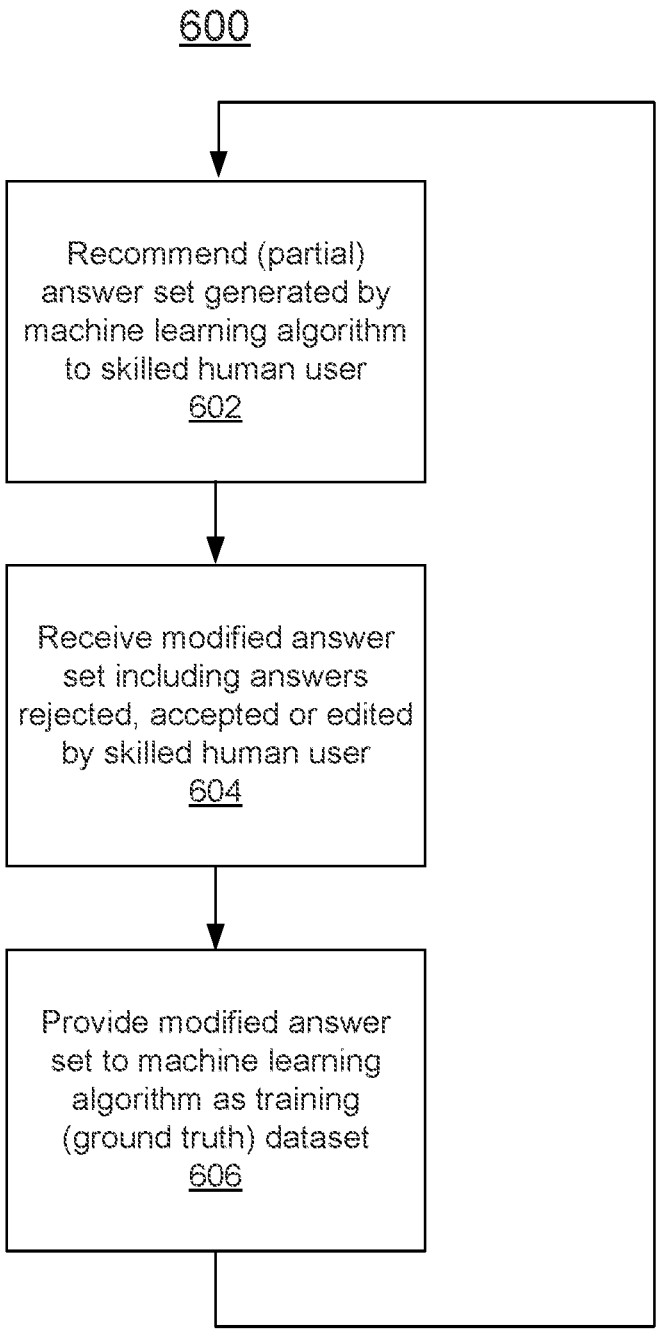
FIG. 6 shows an example method for generating a ground truth dataset based on user feedback.

FIG. 6 shows an example method 600 for generating a ground truth dataset $M'_{i,j}$ for all i in training set, and all standards documents j, based on user feedback. At 602, an answer set of scores(i,j) evaluating the mapping of a patent i to standards document j generated by a machine learning algorithm in a patent recommender system may be provided to a skilled human user. At 604, a modified answer set may be received as input from the skilled human user, and may include rejected, accepted and/or edited answer by the user. At 606, the modified answer set may be provided to the machine learning algorithm as a ground truth training data set to train the machine learning algorithm and improve the performance of the patent recommender system. For example, for each pair of the i=1 ... Y patent documents and the j=1 ... X standards documents, a ground truth label $M'_{i,j}$ is assigned a value of '1' if the (patent, standard) pair of the user accepts the standard recommendation for patent i, and a value of '0' if the user rejects the standard recommendation for patent i:

$$M'_{i,j} = \begin{cases} 1 \text{ if human accepts standard recommendation} \\ 0 \text{ otherwise} \end{cases} \quad \text{Equation (2)}$$

The ground truth dataset $M'_{i,j}$, for all i in training set, and all standards documents j, generated by the method 600 may be used as training input to train any of the machine learning-based patent recommender systems disclosed herein (e.g., machine learning-based patent recommender system 400 and 500 in FIGS. 4 and 5). Adding the responses from skilled humans interacting with the ranked list of standards sections enables the patent recommender system to get more fine-grained knowledge of which parts of standards map to a patent according to the human operator. This feedback enables the system to over time converge closer to what a human performing the ranking would recommend.

The mapping recommender methods and systems disclosed herein employ machine learning to yield significant improvements in precision/recall curves over the baseline IR systems in both the pilot study and full disclosure datasets, respectively.

Figure 7:
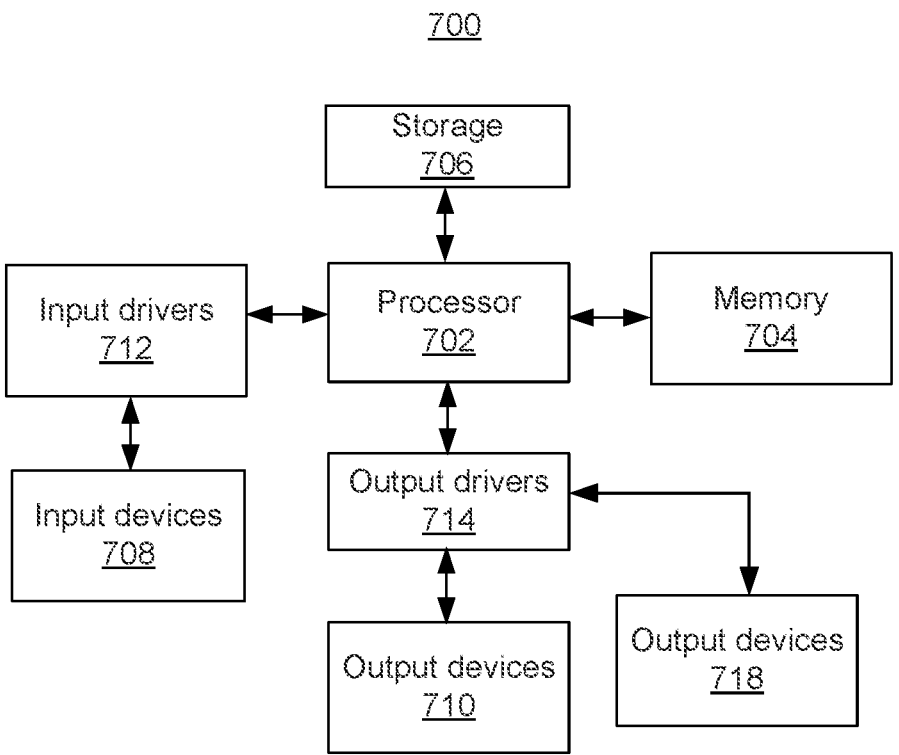
FIG. 7 shows a block diagram of a computing system in which one or more disclosed embodiments may be implemented.

In an example, the IR system 200, the method 300 for generating a ground truth dataset, machine learning-based patent recommender system 400, machine learning-based patent recommender system 500, the method 600 for training a machine learning algorithm, and any subset or one or more component(s) thereof, may be implemented using software and/or hardware and may be partially or fully implemented in a computing system, such as the computing system 700 shown in FIG. 7.

FIG. 7 is a block diagram of a computing system 700 in which one or more disclosed embodiments may be implemented. The computing system 700 may be, for example, a computer, a gaming device, a handheld device, a set-top box, a television, a mobile phone, or a tablet computer. The computing system 700 may include a processor 702, a memory 704, a storage 706, and one or more input devices 708 and/or one or more output devices 710 for interacting with users and/or external devices (not shown). The device 400 may include an input driver(s) 712 and/or an output driver(s) 714. The device 700 may include additional components not shown in FIG. 7.

The processor 702 may include a central processing unit (CPU), a graphics processing unit (GPU), a CPU and GPU located on the same die, or one or more processor cores, wherein each processor core may be a CPU or a GPU. The memory 704 may be located on the same die as the processor 702, or may be located separately from the processor 702. The memory 704 may include a volatile or non-volatile memory, for example, random access memory (RAM), dynamic RAM, or a cache.

The storage 706 may include a fixed or removable storage, for example, a hard disk drive, a solid state drive, an optical disk, or a flash drive. The input devices 708 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 710 may include a display, a speaker, a printer, a haptic feedback device, one or more lights, an antenna, or a network connection (e.g., a wireless local area network card for transmission and/or reception of wireless IEEE 802 signals).

The input driver 712 may communicate with the processor 702 and the input devices 708, and may permit the processor 702 to receive input from the input devices 708. The output driver 714 may communicate with the processor 702 and the output devices 710, and may permit the processor 702 to send output to the output devices 710. The output driver 714 may be configured to accept compute commands and graphics rendering commands from processor 702, to process those compute and graphics rendering commands, and to provide pixel output to an output display device 418 for display.

In an example, with reference to FIG. 5, the machine learning-based patent recommender system 500, and all sub-components of the machine learning-based patent recommender system 500 (e.g., feature vector generators 508/510/520, dimensionality reduction functions 512 and 514, comparison score generator 515, and binary classifier 522, etc.) may be implemented, at least in part, in one or more processors 702 and may access files and store files and information (e.g., patents i, standards documents j, feature vectors 508, 510, 520, score(i,j), etc.) to memory 704 and/or storage 706 in FIG. 7. Moreover, information such as score(i,j) (or a ranked order of the scores) may be provided to a user via output drivers 714 and/or output devices 718.

It should be understood that many variations are possible based on the disclosure herein. Although features and elements are described above in particular combinations, each feature or element may be used alone without the other features and elements or in various combinations with or without other features and elements.

The methods and elements disclosed herein may be implemented in/as a general purpose computer, a processor, a processing device, or a processor core. Suitable processing devices include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be used in a semiconductor manufacturing process to manufacture a processor which implements aspects of the embodiments.

What is claimed is:

1. A patent recommender system for mapping a patent to a plurality of technical standard documents in terms of relevance, the patent recommender system comprising:

a computer-accessible storage device configured to store the patent and the plurality of technical standard documents;

a processor configured to:

train a machine learning algorithm using at least one ground truth training dataset pertaining to the plurality of technical standard documents;

receive, from the computer-accessible storage device, a patent query that defines patentable subject matter of the patent;

measure, for terms in the patent query, term frequencies and document frequencies;

convert the patent query into a first feature vector by building a first Term Frequency-Inverse Document Frequency (TF-IDF) vector by combining the measured term frequencies and document frequencies of the patent query;

apply a natural language processing algorithm to the first feature vector to generate a reduced dimension first feature vector;

for each of the plurality of technical standard documents:

receive, from the computer-accessible storage device, the technical standard document;

measure, for terms in the technical standard document, term frequencies and document frequencies;

convert the technical standard document into a second feature vector by building a second Term Frequency-Inverse Document Frequency (TF-IDF) vector by combining the measured term frequencies and document frequencies of the technical standard document;

apply the natural language processing algorithm to the second feature vector to generate a reduced dimension second feature vector;

compare the first feature vector to the second feature vector using an information retrieval (IR) scoring method to generate an intermediate numerical score representing how similar the patent is to the technical standard document;

concatenate the reduced dimension first feature vector, the reduced dimension second feature vector, and the intermediate numerical score to generate a stacked feature vector augmented by the intermediate numerical score;

apply the machine learning algorithm to the stacked feature vector to generate a numerical score indicating how similar the patent is to the technical standard document; and provide the numerical score to an output device to be provided to a user.

2. The patent recommender system of claim 1, wherein the processor is further configured to:

generate a rank-ordered list of the plurality of technical standard documents in order of decreasing numerical score indicating relevance of each of the plurality of technical standard documents to the patent; and provide the rank-ordered list of the plurality of technical standard documents to the output device to be provided to the user.

3. The patent recommender system of claim 1, wherein the patent query includes at least one claim from the patent.

4. The patent recommender system of claim 1, wherein the processor is configured to convert the patent query into the first feature vector and convert the technical standard document into the second feature vector using an embedding layer of a deep neural network that is trained across multiple documents.

5. The patent recommender system of claim 1, wherein the natural language processing algorithm uses latent semantic analysis (LSA).

6. The patent recommender system of claim 1, wherein the machine learning algorithm is a binary classifier.

7. The patent recommender system of claim 6, wherein the binary classifier is a support vector machine (SVM).

8. The patent recommender system of claim 1, wherein the processor is further configured to:

generate the ground truth training dataset based on Intellectual Property Rights (IPR) disclosures by generating, for each patent-technical standard document pair in a training set, a ground truth label that is assigned a value of '1' if the patent-technical standard document pair is among the IPR disclosures, and a value of '0' otherwise.

9. The patent recommender system of claim 1, wherein the processor is further configured to:

receive, from an input device, a second ground truth training dataset based on feedback from the user that includes, for each patent-technical standard document pair in a training set, a ground truth label that is assigned is assigned a value of '1' if the user accepts a recommendation for the patent-technical standard document pair, and a value of '0' otherwise.

10. A method for mapping a patent to a plurality of technical standard documents in terms of relevance, the method comprising:

storing the patent and the plurality of technical standard documents;

training a machine learning algorithm using at least one ground truth training dataset pertaining to the plurality of technical standard documents;

receiving a patent query that defines patentable subject matter of the patent;

measuring, for terms in the patent query, term frequencies and document frequencies;

converting the patent query into a first feature vector by building a first Term Frequency-Inverse Document Frequency (TF-IDF) vector by combining the measured term frequencies and document frequencies of the patent query;

applying a natural language processing algorithm to the first feature vector to generate a reduced dimension first feature vector;

for each of the plurality of technical standard documents:

receiving the technical standard document;

measuring, for terms in the technical standard document, term frequencies and document frequencies;

converting the technical standard document into a second feature vector by building a second Term Frequency-Inverse Document Frequency (TF-IDF) vector by combining the measured term frequencies and document frequencies of the technical standard document;

applying the natural language processing algorithm to the second feature vector to generate a reduced dimension second feature vector;

comparing the first feature vector to the second feature vector using an information retrieval (IR) scoring method to generate an intermediate numerical score representing how similar the patent is to the technical standard document;

concatenating the reduced dimension first feature vector, the reduced dimension second feature vector, and the intermediate numerical score to generate a stacked feature vector augmented by the intermediate numerical score;

applying the machine learning algorithm to the stacked feature vector to generate a numerical score indicating how similar the patent is to the technical standard document; and providing the numerical score to an output device to be provided to a user.

11. The method of claim 10, further comprising:

generating a rank-ordered list of the plurality of technical standard documents in order of decreasing numerical score indicating relevance of each of the plurality of technical standard documents to the patent; and providing the rank-ordered list of the plurality of technical standard documents to the output device to be provided to the user.

12. The method of claim 10, wherein the patent query includes at least one claim from the patent.

13. The method of claim 10, wherein the converting the patent query into the first feature vector and the converting the technical standard document into the second feature vector uses an embedding layer of a deep neural network that is trained across multiple documents.

14. The method of claim 10, wherein the natural language processing algorithm uses latent semantic analysis (LSA) and the machine learning algorithm is a binary classifier.

15. The method of claim 10, further comprising:

generating the ground truth training dataset based on Intellectual Property Rights (IPR) disclosures by generating, for each patent-technical standard document pair in a training set, a ground truth label that is assigned a value of '1' if the patent-technical standard document pair is among the IPR disclosures, and a value of '0' otherwise.

* * * * *